US 12,153,958 B2

United States Patent
Acharya et al.

(10) Patent No.: US 12,153,958 B2
(45) Date of Patent: Nov. 26, 2024

(54) VMID AS A GPU TASK CONTAINER FOR VIRTUALIZATION

(71) Applicants: Advanced Micro Devices, Inc., Santa Clara, CA (US); ATI Technologies ULC, Markham (CA)

(72) Inventors: Anirudh R. Acharya, San Diego, CA (US); Michael J. Mantor, Orlando, FL (US); Rex Eldon McCrary, Orlando, FL (US); Anthony Asaro, Markham (CA); Jeffrey Gongxian Cheng, Markham (CA); Mark Fowler, Boxborough, MA (US)

(73) Assignees: Advanced Micro Devices, Inc., Santa Clara, CA (US); ATI Technologies ULC, CA Markham (CA)

( * ) Notice: Subject to any disclaimer, the term of this patent is extended or adjusted under 35 U.S.C. 154(b) by 21 days.

(21) Appl. No.: 18/045,128

(22) Filed: Oct. 7, 2022

(65) Prior Publication Data
US 2023/0055695 A1 Feb. 23, 2023

Related U.S. Application Data

(63) Continuation of application No. 16/938,381, filed on Jul. 24, 2020, now Pat. No. 11,467,870, which is a (Continued)

(51) Int. Cl.
*G06F 9/46* (2006.01)
*G06F 9/48* (2006.01)
(Continued)

(52) U.S. Cl.
CPC .............. *G06F 9/4881* (2013.01); *G06F 9/52* (2013.01); *G06F 9/54* (2013.01); *G06F 12/1009* (2013.01); *G06F 12/145* (2013.01); *G06T 1/20* (2013.01)

(58) Field of Classification Search
CPC ................. G06F 9/4881; G06F 9/52
See application file for complete search history.

(56) References Cited

U.S. PATENT DOCUMENTS 9,256,623 B2 2/2016 Ricketts et al.
9,507,638 B2 11/2016 Cuadra et al.
(Continued)

FOREIGN PATENT DOCUMENTS

JP 2000347940 A 12/2000
JP 2016527652 A 9/2016

OTHER PUBLICATIONS

International Search Report and Written Opinion in International Application No. PCT/US2019/039257, mailed Oct. 15, 2019, 12 pages.
(Continued)

*Primary Examiner* — Gregory A Kessler
(74) *Attorney, Agent, or Firm* — Kowert, Hood, Munyon, Rankin & Goetzel, P.C.; Rory D. Rankin (57) ABSTRACT

Systems, apparatuses, and methods for abstracting tasks in virtual memory identifier (VMID) containers are disclosed. A processor coupled to a memory executes a plurality of concurrent tasks including a first task. Responsive to detecting one or more instructions of the first task which correspond to a first operation, the processor retrieves a first identifier (ID) which is used to uniquely identify the first task, wherein the first ID is transparent to the first task. Then, the processor maps the first ID to a second ID and/or a third ID. The processor completes the first operation by using the second ID and/or the third ID to identify the first task to at least a first data structure. In one implementation, the first operation is a memory access operation and the first data structure is a set of page tables. Also, in one implementation, the second ID identifies a first application of the first task
(Continued)

and the third ID identifies a first operating system (OS) of the first task.

20 Claims, 10 Drawing Sheets

Related U.S. Application Data continuation of application No. 16/050,948, filed on Jul. 31, 2018, now Pat. No. 10,725,822.

(51) Int. Cl.
*G06F 9/52* (2006.01)
*G06F 9/54* (2006.01)
*G06F 12/1009* (2016.01)
*G06F 12/14* (2006.01)
*G06T 1/20* (2006.01)

(56) References Cited

U.S. PATENT DOCUMENTS

| 10,725,822 | B2 | 7/2020 | Acharya et al. |
| 11,467,870 | B2 | 10/2022 | Acharya et al. |
| 2014/0337389 | A1 | 11/2014 | Ricketts et al. |
| 2015/0277993 | A1 | 10/2015 | Gu et al. |
| 2016/0092677 | A1 | 3/2016 | Patel et al. |
| 2018/0081561 | A1 | 3/2018 | Todd et al. |
| 2018/0365057 | A1 | 12/2018 | Nield et al. |

OTHER PUBLICATIONS

Chatterjee et al., "Dynamic Task Parallelism with a GPU Work-Stealing Runtime System", Languages and Compilers for Parallel Computing: 24th International Workshop, Jan. 2013, 15 pages.
First Examination Report in Indian Patent Application No. 202017057502, mailed Jan. 17, 2022, 9 pages.
Non-Final Office Action in Japanese Patent Application No. 2021-505214, mailed Mar. 29, 2022, 5 pages.

| Container ID 805 | OS/VF ID 810 | VMID 815 |
|---|---|---|
| 0x9 | 0x14 | 0xC |
| 0x5 | 0x0A | 0x1 |
| ... | ... | ... |
| 0x2 | 0x5E | 0xC |

Mapping Table 800

VMID AS A GPU TASK CONTAINER FOR VIRTUALIZATION

CROSS REFERENCE TO RELATED APPLICATIONS

This application is a continuation of U.S. patent application Ser. No. 16/938,381, now U.S. Pat. No. 11,467,870, entitled "VMID AS A GPU TASK CONTAINER FOR VIRTUALIZATION", filed Jul. 24, 2020 which is a continuation of U.S. patent application Ser. No. 16/050,948, now U.S. Pat. No. 10,725,822, entitled "VMID AS A GPU TASK CONTAINER FOR VIRTUALIZATION", filed Jul. 31, 2018, the entirety of which is incorporated herein by reference.

BACKGROUND

Description of the Related Art

The desire to use a graphics processing unit (GPU) for general computation has become more common recently due to the performance per unit power and cost of modern GPUs. The computational capabilities for GPUs have grown at a rate exceeding that of the corresponding central processing unit (CPU) platforms. This growth, coupled with the explosion of the mobile computing market (e.g., notebooks, mobile smart phones, tablets) and the supporting server/enterprise systems, has been used to achieve a quality consistent with a desired user experience. Consequently, the combined use of CPUs and GPUs for executing workloads with data parallel content is becoming a volume technology.

GPUs exploit large amounts of thread-level parallelism to achieve high instruction throughput. This high throughput has helped make GPUs an essential computational resource in many different paradigms. In many types of computing environments, multiple applications share a single processing unit. Executing simultaneous multiple applications from one or more Operating Systems requires various support mechanisms in hardware and in software. One key mechanism is virtual memory, which manages and protects the address space of each application running on the machine. However, modern GPUs lack support for parallel execution of multiple applications. As a result, GPU suffer from high performance overheads when running multiple concurrent applications.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for abstracting tasks in virtual memory identifier (VMID) containers are disclosed herein. A processor coupled to a memory executes a plurality of concurrent tasks including a first task. Responsive to detecting one or more instructions of the first task which correspond to a first operation, the processor retrieves a first identifier (ID) which is used to uniquely identify the first task, wherein the first ID is transparent to the first task. Then, the processor maps the first ID to a second ID and/or a third ID. The processor completes the first operation by using the second ID and/or the third ID to identify the first task to at least a first data structure. In one implementation, the first operation is a memory access operation and the first data structure is a set of page tables. Also, in one implementation, the second ID identifies a first application of the first task and the third ID identifies a first operating system (OS) of the first task.

Figure 1:
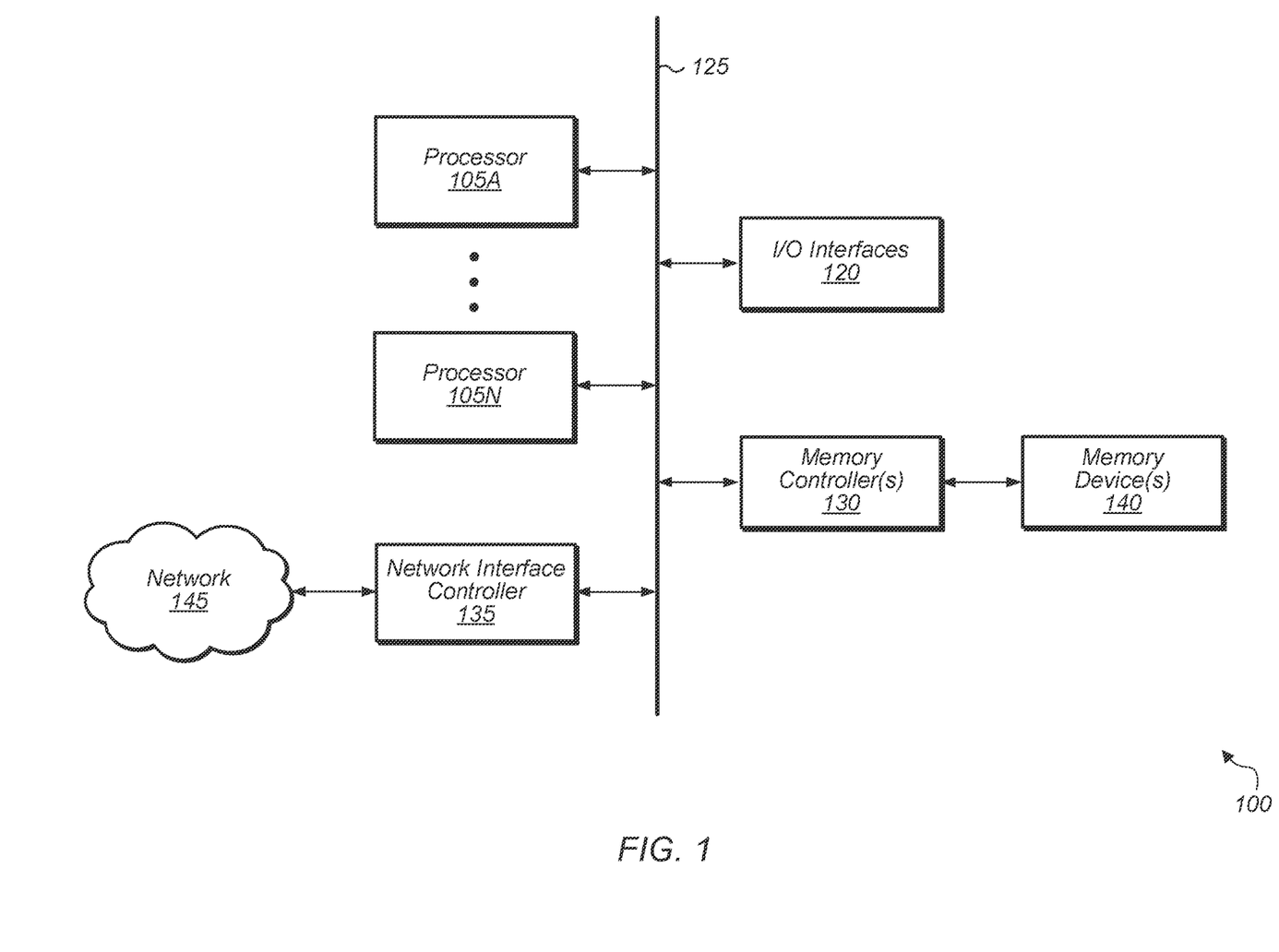
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface controller (NIC) 135, and memory device(s) 140. In other implementations, computing system 100 includes other components and/or computing system 100 is arranged differently. Processors 105A-N are representative of any number of processors which are included in system 100. In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface controller (NIC) 135 receives and sends network messages across network 145.

Network 145 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 145 further includes remote direct memory access (RDMA) hardware and/or software, transmission control protocol/internet protocol (TCP/IP) hardware and/or software, router, repeaters, switches, grids, and/or other components.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
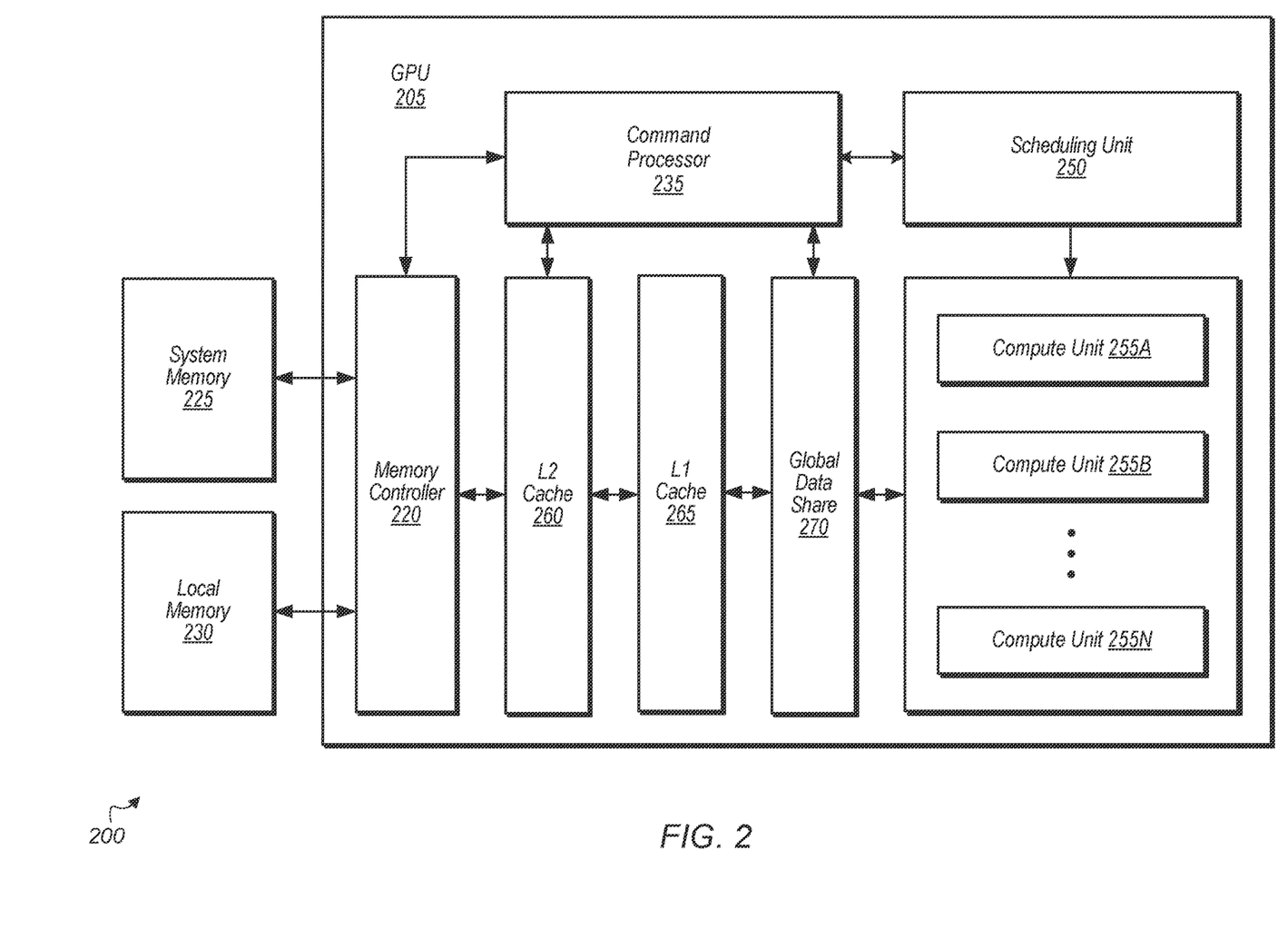
FIG. 2 is a block diagram of another implementation of computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, scheduling unit 250, compute units 255A-N, memory controller 220, global data share 270, level one (L1) cache 265, and level two (L2) cache 260. Although not shown in FIG. 2, in one implementation, compute units 255A-N also include one or more caches and/or local memories within each compute unit 255A-N. In other implementations, GPU 205 includes other components, omits one or more of the illustrated components, has multiple instances of a component even if only one instance is shown in FIG. 2, and/or is organized in other suitable manners.

In various implementations, computing system 200 executes any of various types of software applications. In one implementation, as part of executing a given software application, a host CPU (not shown) of computing system 200 launches tasks to be executed on GPU 205. Command processor 235 receives tasks from the host CPU and issues tasks to scheduling unit 250 for scheduling on compute units 255A-N. In one implementation, when scheduling unit 250 schedules a given task on compute units 255A-N, scheduling unit 250 generates a unique container identifier (ID) for the given task by hashing together an operating system (OS) or virtual function (VF) ID with a virtual memory (VM) ID of the given task. Threads within tasks executing on compute units 255A-N access various data structures internal and external to computing system 200. When a thread accesses a data structure external to computing system 200, the container ID is mapped to a VFID and/or VMID, with the VFID and/or VMID used to identify the thread to the external data structure.

Figure 3:
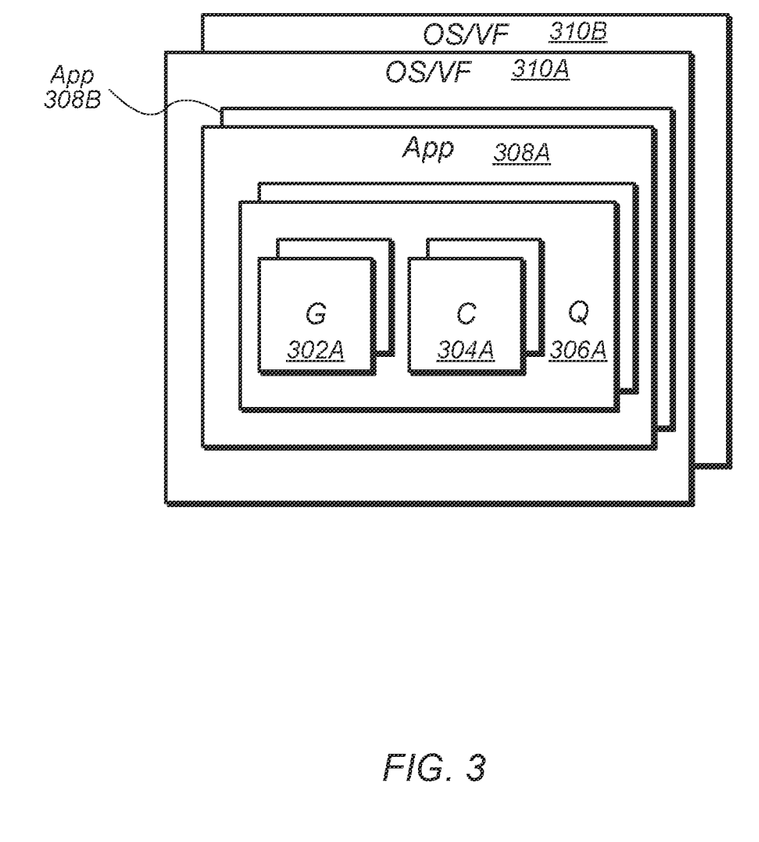
FIG. 3 illustrates a block diagram of one implementation of the virtual environment of a GPU.

Turning now to FIG. 3, a block diagram of one implementation of the virtual environment 300 of a GPU is shown. A GPU is a massively parallel machine which is able to support multiple concurrent tasks. GPUs are employed to handle graphics and/or compute workloads in a variety of applications. For graphics workloads, the GPU includes a deep, mixed pipeline which includes fixed function hardware and programmable shaders. A typical workload source hierarchy for GPUs includes the levels of operating system (OS) and virtual function (VF) 310A-B, applications 308A-N, queue(s) 306A, draw calls, and dispatches. Each queue 306A includes any number of graphics task(s) 302A and/or compute task(s) 304A. When supporting multi-tasking, there are potentially multiple workloads from various sources that are active on the GPU concurrently.

When executing multiple different types of concurrent applications on a GPU, each different workload is tagged to identify and manage the workload to implement various functions. For example, each different workload is tagged for synchronization and reset purposes, to implement memory management techniques and structures, to manage interrupts, and to implement other functionality. In one implementation, each different workload is identified using a container ID to differentiate the workload from the other workloads. In one implementation, the container ID is created from a hash of the OS or VF ID and the VMID. This allows the GPU to support multiple concurrent queues, applications, draws, and dispatches from different guest OS's. In other implementations, the container ID is created from other types of functions and/or from other types of values.

While several of the discussions presented herein identify characteristics of a GPU, it should be understood that the same techniques apply to other types of processors with parallel execution capabilities (e.g., multi-core CPUs, FPGAs, ASICs, DSPs). Accordingly, throughout this disclosure, when a technique is described as being performed by or implemented on a GPU, it should be understood that the technique is also able to be performed on other types of processors.

Figure 4:
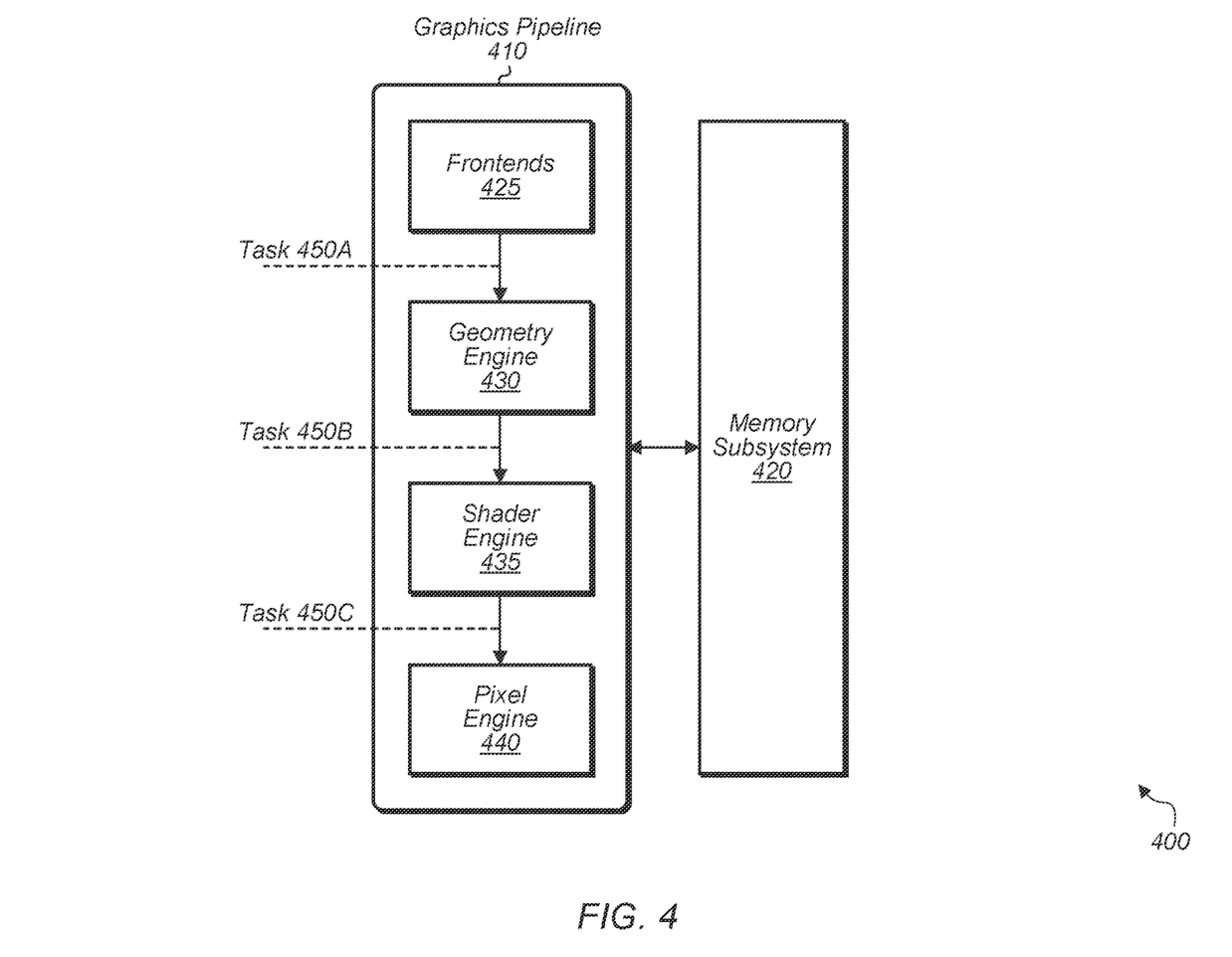
FIG. 4 illustrates a block diagram of one implementation of a GPU.

Turning now to FIG. 4, a block diagram of one implementation of a GPU 400 is shown. In one implementation, GPU 400 includes graphics pipeline 410 coupled to memory subsystem 420. In one implementation, graphics pipeline 410 includes multi-tasking support in each pipeline stage. Frontends 425 includes various queues for storing incoming tasks which have been forwarded to graphics pipeline 410. Geometry engine 430 performs rendering of primitives using draw call commands for the different tasks being executed on graphics pipeline 410. Shader engine 435 implements the various shader stages involved in rendering graphics. In one implementation, pixel engine 440 is invoked to compute output information and cause results to be written to output surfaces after an image being rendered is divided into a grid of bins or tiles in screen space. In some implementations, pixel engine 440 calculates the values of vertex attributes that are to be interpolated across a rasterized object. In other implementations, graphics pipeline 410 includes other stages or engines and/or the individual engines perform other types of operations.

Typically, a GPU includes pipelined support for multitasking to handle the order and dependency requirements in each stage. This refers to each stage of graphics pipeline 410 executing a separate task (e.g., task 450A on geometry engine 430, task 450B on shader engine 435, task 450C on pixel engine 440). In one implementation, graphics pipeline 410 is configured to support independent and concurrent graphics tasks. In this implementation, the source hierarchy details are obscured from each stage in the GPU. The support for independent and concurrent graphics tasks of graphics pipeline is supported by having a container ID used to distinguish each task from the other concurrent tasks which are executing on the stage.

Figure 5:
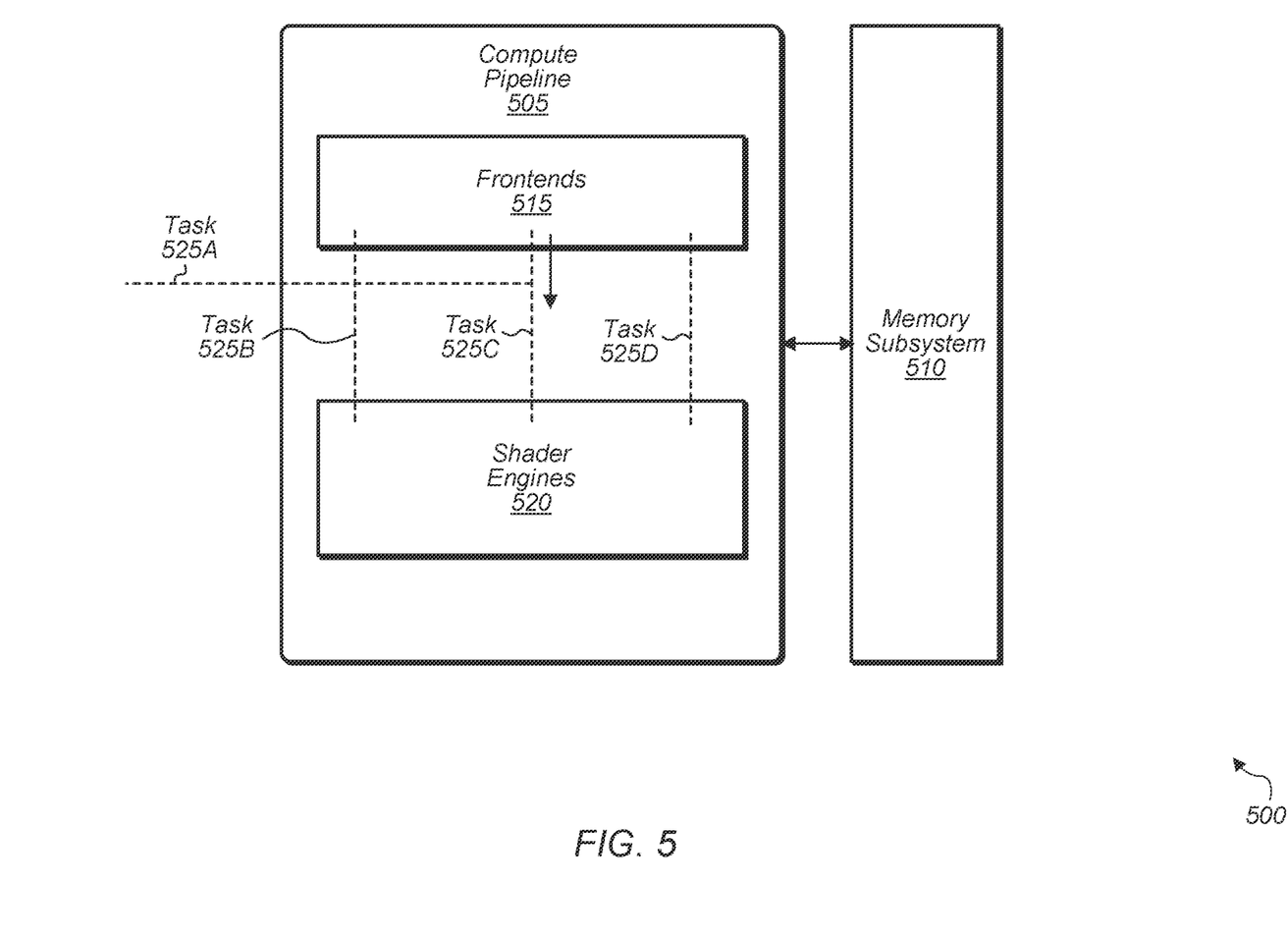
FIG. 5 illustrates a block diagram of one implementation of a processor with a compute pipeline.

Referring now to FIG. 5, a block diagram of one implementation of a processor 500 with a compute pipeline 505 is shown. In one implementation, processor 500 includes at least compute pipeline 505 coupled to memory subsystem 510. In one implementation, processor 500 is a GPU. In other implementations, processor 500 is any of various other types of processing units (e.g., FPGA, ASIC, DSP, multi-core CPU).

Compute pipeline 505 includes frontends 515 coupled to shader engines 520. Compute pipeline 505 includes vertical and/or horizontal partitioning to enable concurrent execution of tasks 525A-D. For example, task 525A is launched onto shader engines 520 in one implementation, followed by other tasks in subsequent clock cycles. In another implementation, tasks 525B-D are launched and executed concurrently on shader engines 520. Shader engines 520 are partitioned vertically in this implementation to enable the concurrent execution of multiple tasks. The vertical partitioning refers to the ability of the processing units and processing logic of shader engines 520 to maintain state of multiple tasks and/or operate on multiple tasks in the same clock cycle. In one implementation, the separate tasks are identified using container IDs, with each different task having a unique container ID.

In one implementation, each stage of the compute pipeline 505 is vertically partitioned. For example, frontends 515 includes queues which are partitioned to allow multiple different tasks to be launched and run concurrently. Also, shader engines 520 include vertical partitions to allow multiple compute tasks to execute concurrently. Frontends 515 and shader engines 520 are able to execute workloads from numerous sources simultaneously. In one implementation, each stage or partition in compute pipeline 505 is unaware of the source hierarchy of the tasks when executing these individual tasks. In this implementation, the source hierarchy details are only utilized when boundaries of processor 500 are traversed by a task.

Figure 6:
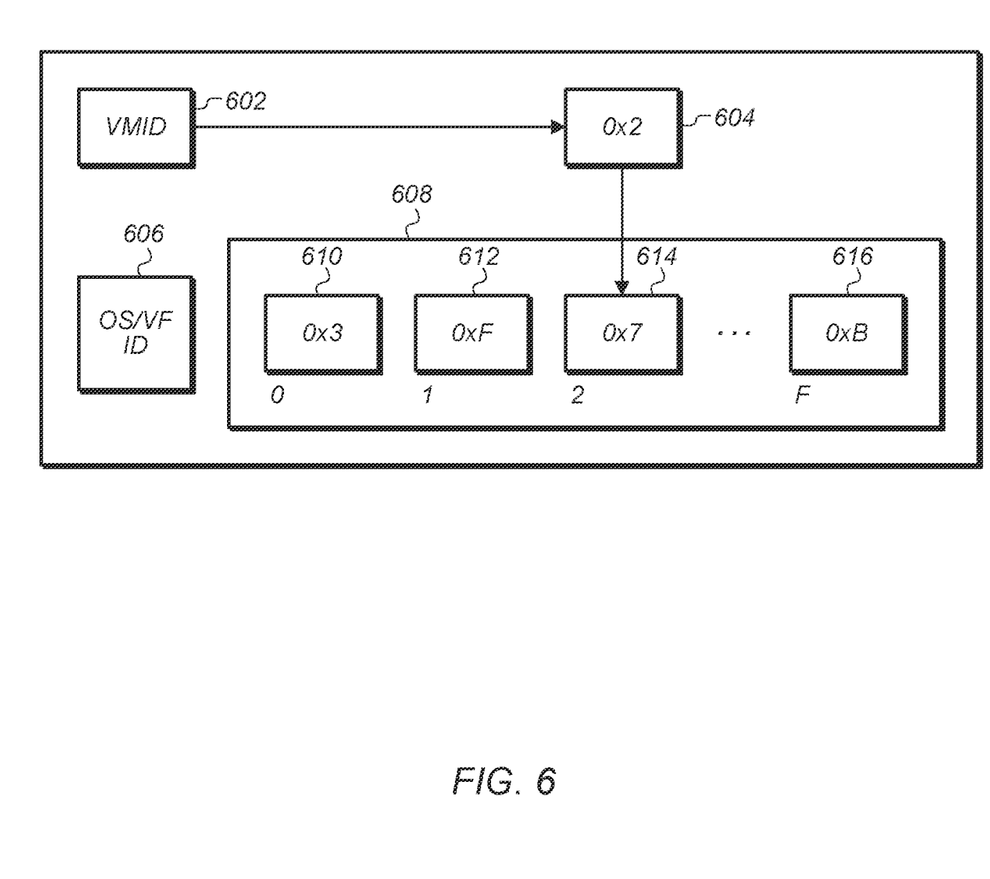
FIG. 6 illustrates a block diagram of one implementation of abstracting tasks in virtual memory identifier (VMID) containers.

Turning now to FIG. 6, a block diagram of one implementation of abstracting tasks in virtual memory identifier (VMID) containers is shown. In one implementation, VMIDs 602 are typically used for memory management operations to differentiate applications which are executing on a processor. However, in another implementation, task container IDs 604 are used in place of VMIDs 602 to abstract the source hierarchy of executing tasks. In various implementations, the processor does not need to discern the source of a task during execution. Rather, the processor only needs to discern the source when interacting with external components or external data structures. In one implementation, the container IDs 604 are used to bundle memory data structures. In this implementation, the processor provides memory protection by not allowing one container ID to access the memory contents of another container ID.

In one implementation, container IDs 604 are managed by hardware mechanisms and are transparent to the software hierarchy above the hardware execution level. The rest of the software hierarchy continues using existing mechanisms of source tracking. These existing mechanisms include OS ID, process ID, queue ID, and so on. In one implementation, task tagging and source hierarchy are relevant only at boundaries from the processor to external components. For example, synchronization tasks such as end-of-pipe and reset operations will reference the source of a task. Also, memory transactions outside of the processor will use the source of a task to map to the correct memory management data structures (e.g., page tables). Additionally, interrupt handling is tracked on a per source basis to identify which of the currently executing tasks to interrupt. Still further, peripheral component interconnect express (PCI-e) bus-device-function resolution is tracked on a per source basis to determine the source of a virtual or physical function. Other types of operations which are performed at the boundaries of the processor to track the source of a task are possible and are contemplated.

In one implementation, a mapping table 608 is maintained at each boundary between the processor and external components. The mapping table maps the container ID 604 of the task to operating system (OS) ID or virtual function (VF) ID 606, process ID, or otherwise. Using a container ID 604 to identify a source of a task enables concurrent draws and dispatches, queues, applications, virtual functions, and OS's to execute on the processor. Entries 610, 612, 614, and 616 are representative of any number of entries in mapping table 608. In one implementation, mapping table 608 has 16 entries while in other implementations, mapping table 608 includes other numbers of entries.

Figure 7:
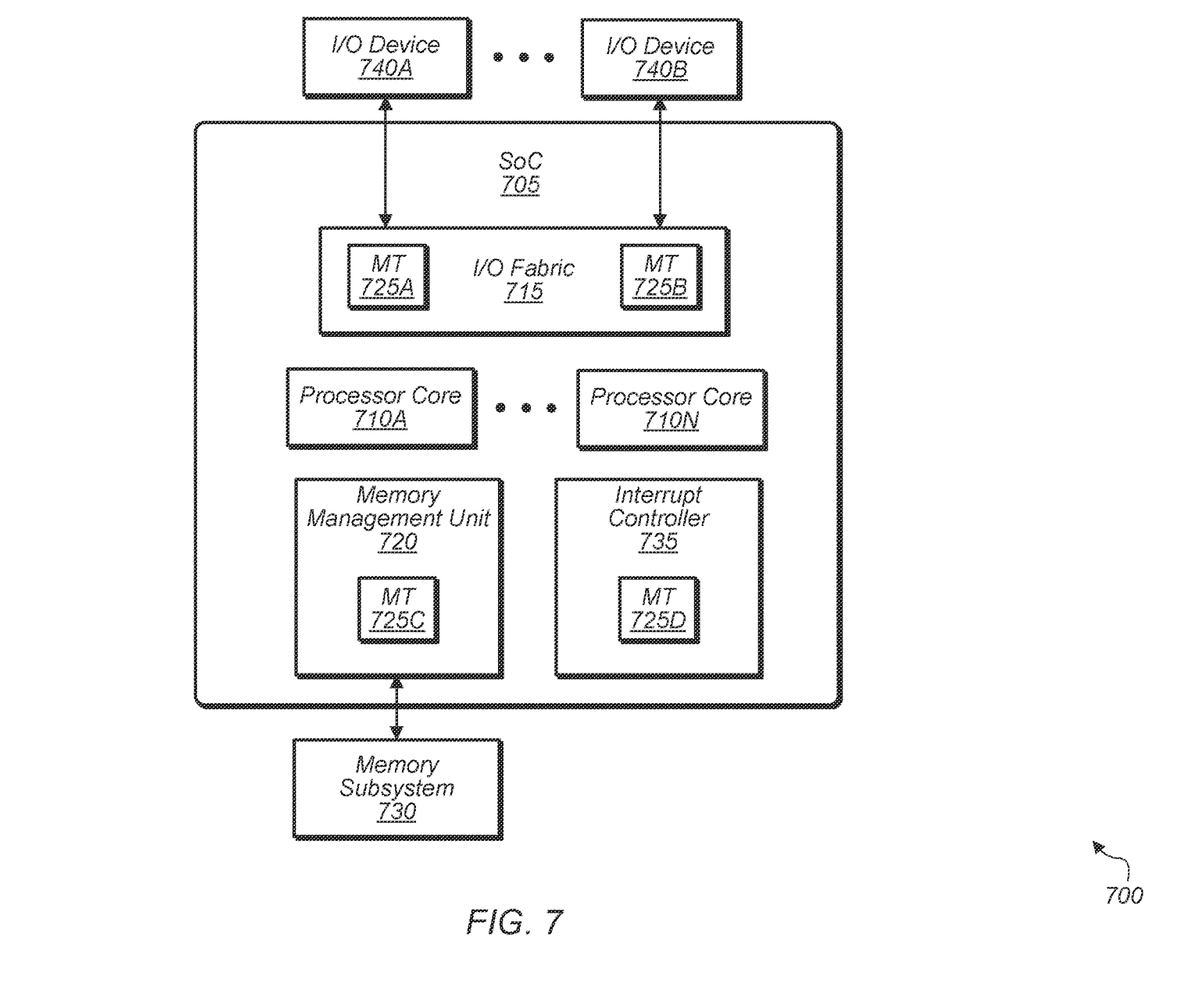
FIG. 7 illustrates a block diagram of one implementation of a computing system.

Referring now to FIG. 7, a block diagram of one implementation of a computing system 700 is shown. In one implementation, computing system 700 uses container IDs to track tasks in a multi-task concurrent execution environment. In order to use container IDs to track tasks, system 700 includes multiple mapping tables (MTs) 725A-D to map container IDs to the source hierarchy of the tasks. Each MT 725A-D includes any number of entries, with the number of entries varying from implementation to implementation.

In one implementation, system 700 includes system on chip (SoC) 705 coupled to memory subsystem 730 and input/output (I/O) devices 740A-B. I/O devices 740A-B are representative of any number and type of peripheral devices. It is noted that in other implementations, system 700 also includes other components which are not shown to avoid obscuring the figure. SoC 705 includes at least processor cores 710A-N, I/O fabric 715, memory management unit 720, and interrupt controller 735. In one implementation, I/O fabric 715 includes mapping tables 725A-B which correspond to I/O devices 740A-B. Also, MMU 720 and interrupt controller 735 include mapping tables 725C-D, respectively. Mapping table 725C is used to map container IDs to the source hierarchy of tasks to enable access to the appropriate sets of page tables while mapping table 725D is used to map container IDs to corresponding sources for delivering interrupts. In one implementation, the different MTs 725A-D are synchronized so that the entries of each MT match the entries of the other MTs. Accordingly, in this implementation, when an existing entry is evicted from a given MT 725A-D to make room for a new entry for a different container ID, then the other MTs 725A-D are notified and updated to match the given MT 725A-D.

Figure 8:
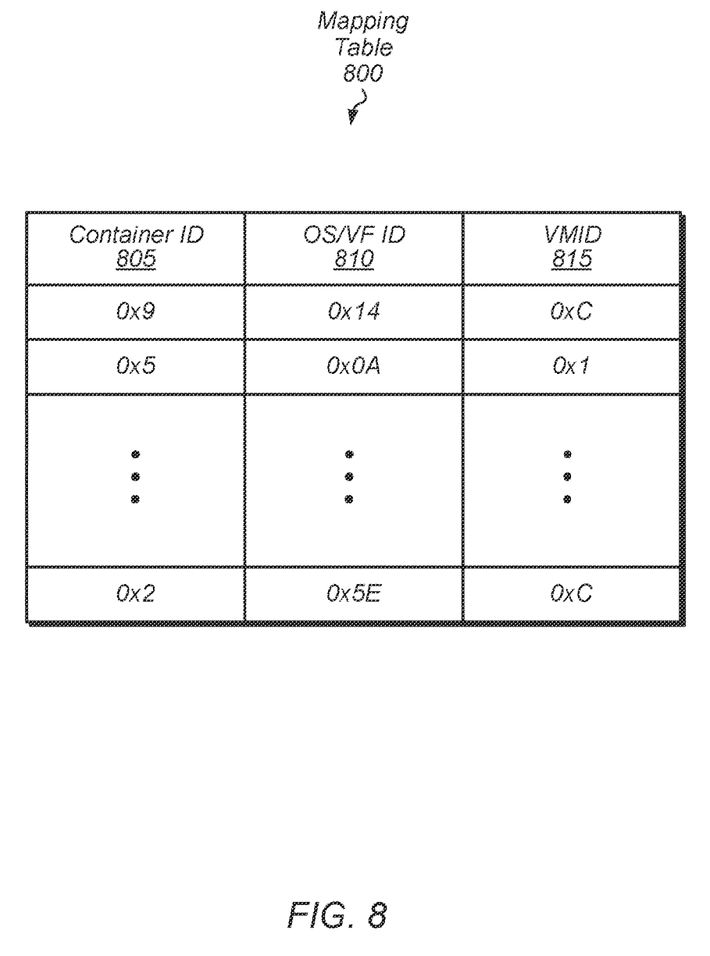
FIG. 8 illustrates one implementation of a mapping table for mapping container IDs to OS or VF IDs.

Turning now to FIG. 8, one implementation of a mapping table 800 for mapping container IDs to OS or VF IDs is shown. In one implementation, a processor (e.g., GPU 205 of FIG. 2) includes one or more copies of mapping table 800 for mapping container IDs to OS/VF IDs and VMIDs. Mapping table 800 includes container ID field 805, OS/VF ID field 810, and VMID field 815. In other implementations, mapping table 800 includes other fields and/or is organized differently. The container ID of a given task is used to perform a lookup of mapping table 800 to find a matching OS/VF ID and VMID for the given task.

When the source of a task needs to be identified to access a given data structure or to interact with an external component, the processor uses mapping table 800 to resolve a given container ID to an OS or VF ID and VMID of the task. The OS or VF ID and/or VMID is then used to identify the source of a task to complete a particular type of operation. For example, a virtual-to-physical address translation is performed by accessing a specific set of page tables for a given container ID. In another example, a particular task is identified for determining where to deliver an interrupt by using mapping table 800 to resolve a container ID to an OS/VF ID and a VMID.

In one implementation, mapping table 800 has a limited number of entries. If mapping table 800 is full and a new task is initiated on the processor, then the processor will evict, suspend or wait for completion of one of the existing entries from mapping table 800 to make room for a new entry for the new task. In some implementations, multiple copies of mapping table 800 are maintained by the processor, with one copy of mapping table 800 stored at each boundary point of the processor. In these implementations, the processor synchronizes the mapping tables to ensure they have the same entries for the various container IDs of the currently executing tasks.

Figure 9:
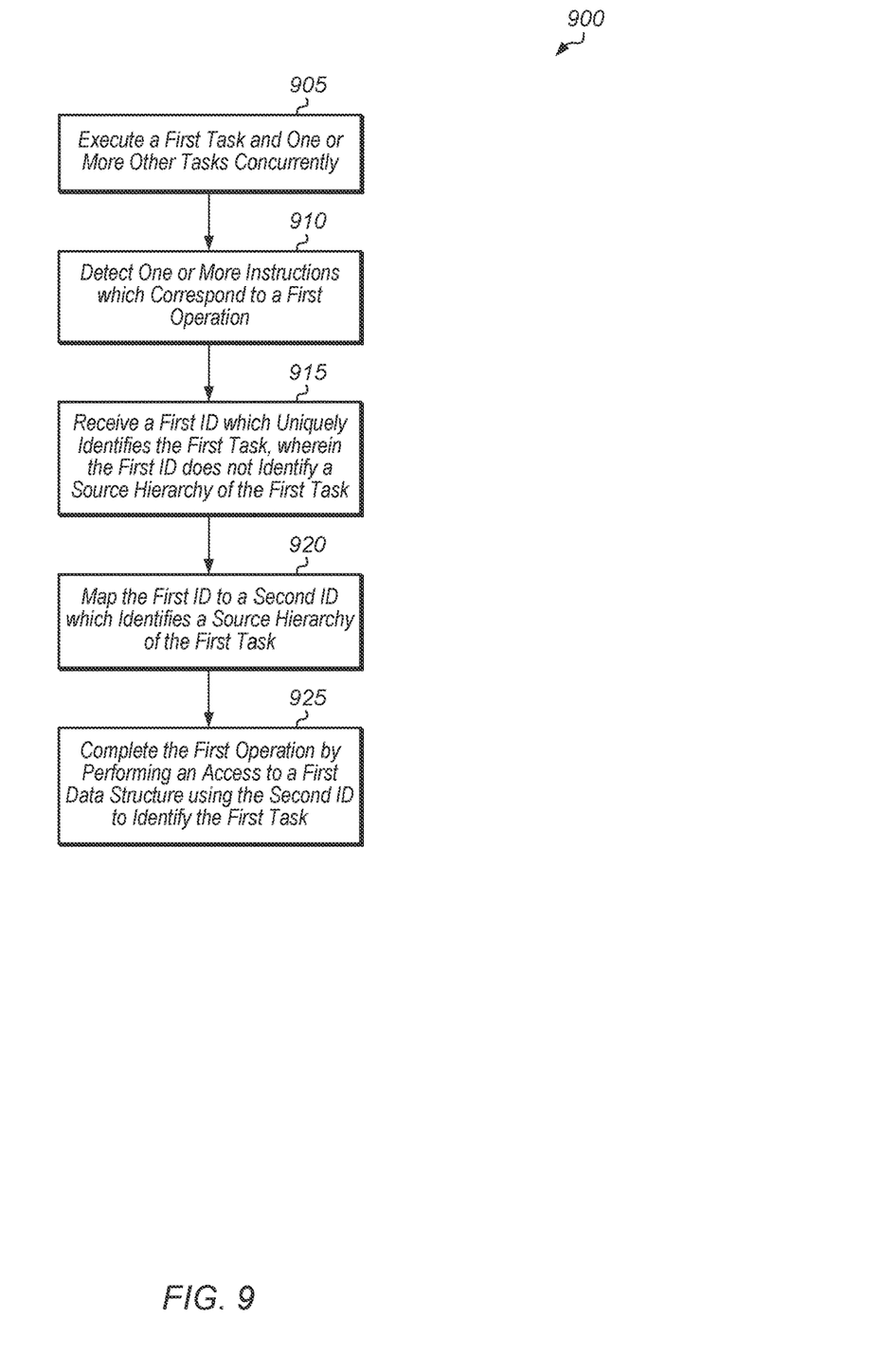
FIG. 9 is a generalized flow diagram illustrating one implementation of a method for abstracting tasks using container IDs.
Figure 10:
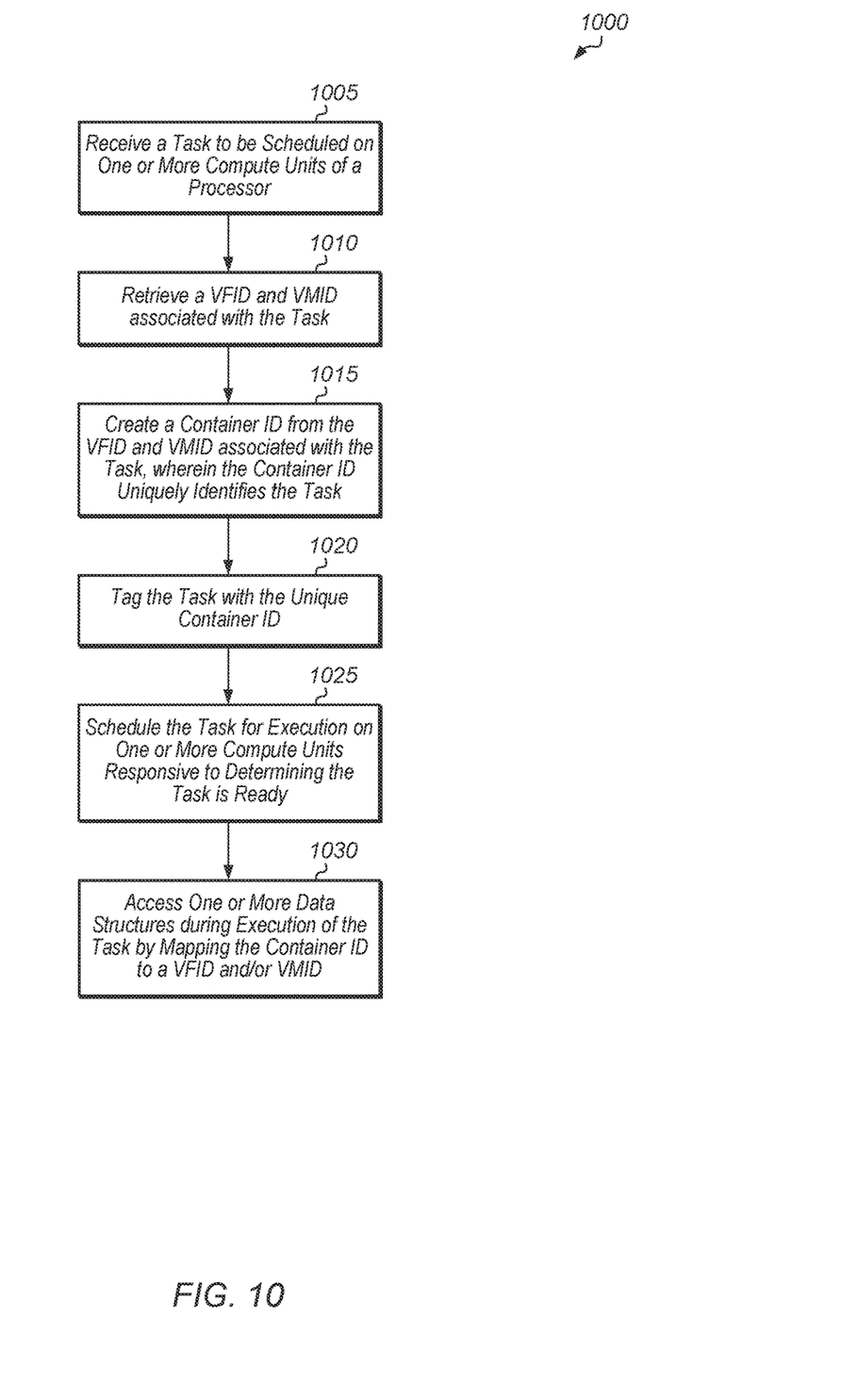
FIG. 10 is a generalized flow diagram illustrating one implementation of a method for a scheduler generating container IDs for tasks.

Referring now to FIG. 9, one implementation of a method 900 for abstracting tasks using container IDs is shown. For purposes of discussion, the steps in this implementation and those of FIG. 10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 900.

A processor executes a first task and one or more other tasks concurrently (block 905). In one implementation, the processor is a GPU. While executing the first task, the processor detects one or more instructions which correspond to a first operation (block 910). In one implementation, the first operation is a memory access operation. In another implementation, the first operation is an operation which targets a component external to the processor. In a further implementation, the first operation is an operation which requires the source of the first task to be identified. In a still further implementation, the first operation is a graphics operation which involves rendering one or more pixels for display. In this implementation, the processor generates one or more pixels to drive to a display as part of the first operation. In other implementations, the first operation is any of various other types of operations.

In response to detecting the one or more instructions of the first task which correspond to the first operation, the processor receives a first identifier (ID) which uniquely identifies the first task, wherein the first ID does not identify a source hierarchy of the first task (block 915). In other words, the first ID is transparent to the first task. In one implementation, the first ID is a container ID. Next, the processor maps the first ID to a second ID which identifies a source hierarchy of the first task (block 920). In another implementation, the processor maps the first ID to a second ID and to a third ID which together identify the source hierarchy of the first task. In this implementation, the second ID identifies a first application of the first task and the third ID identifies a first operating system (OS) of the first task. In this implementation, the source hierarchy refers to an application, OS, and/or virtual function (VF) of the first task. In comparison, the first ID abstracts the source hierarchy of the first task.

Next, the processor completes the first operation by performing an access to a first data structure using the second ID to identify the first task (block 925). In one implementation, the first data structure is a set of virtual to physical address translation page tables. In another implementation, the first data structure is an interrupt table. After block 925, method 900 ends. It is noted that method 900 is able to be performed in parallel for multiple tasks which are being executed concurrently on the processor. These multiple tasks include tasks from two or more different guest OS's.

Turning now to FIG. 10, one implementation of a method 1000 for a scheduler generating container IDs for tasks is shown. A scheduler of a processor (e.g., GPU 205 of FIG. 2) receives a task to be scheduled on one or more compute units of the processor (block 1005). The scheduler retrieves a virtual function (VF) ID and a virtual memory (VM) ID associated with the task (block 1010). In another implementation, the scheduler retrieves an operating system (OS) ID associated with the task. Next, the scheduler creates a container ID for the task from the VFID and VMID associated with the task, wherein the container ID uniquely identifies the task (block 1015). In another implementation, the scheduler creates a unique container ID for the task from the OS ID and VMID associated with the task. In one implementation, the scheduler creates the container ID by generating a hash of the VFID (or OS ID) with the VMID. Then, the scheduler tags the task with the unique container ID (block 1020). In other words, the task is now associated with the unique container ID rather than being associated with the VFID, OS ID, or VMID of the task. This allows the processor to support multiple concurrent tasks from different guest OS's or even from the same OS.

Next, the scheduler schedules the task for execution on one or more compute units responsive to determining the task is ready (block 1025). During execution of the task, the processor accesses one or more data structures by mapping the container ID to a VFID and/or VMID (block 1030). Alternatively, the processor maps the container ID to an OS ID and/or VMID in block 1030. Depending on the implementation, the one or more data structures include page tables, interrupt tables, and/or other data structures. After block 1030, method 1000 ends. It is noted that in one implementation, method 1000 is performed in parallel for multiple tasks which are being executed concurrently on the processor. These multiple tasks include tasks from two or more different guest OS's.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a processor configured to be coupled to a memory, wherein the processor is configured to:
create a container identifier based on a virtual identifier that identifies a task;
tag the task with the container identifier;
schedule the task for execution;
access a data structure during said execution by mapping the container identifier (ID) to a virtual identifier; and
prevent a task with a first container ID from accessing data of a task with a second container ID.

2. The system as recited in claim 1, wherein the data structure is a page table.

3. The system as recited in claim 2, further comprising a mapping table comprising a plurality of entries, each of the plurality of entries being configured to store a mapping between a container ID and a virtual ID.

4. The system as recited in claim 3, wherein the processor is configured to access the mapping table to perform the mapping.

5. The system as recited in claim 1, wherein the container ID is based at least in part on a hash of the virtual ID of the task with one of an operating system ID and a virtual function ID.

6. The system as recited in claim 1, wherein the container ID uniquely identifies the task.

7. The system as recited in claim 1, wherein the processor is a graphics processing unit configured to concurrently execute a first task and a second task, wherein the first task is associated with a first operating system and the second task is associated with a second operating system different from the first operating system.

8. The system as recited in claim 7, wherein the first task is identified using a first container ID and the second task is identified using a second container ID.

9. The system as recited in claim 8, wherein the first container ID is generated based at least in part on an ID associated with the first operating system, and the second container ID is generated based at least in part on an ID associated with the second operating system.

10. A method comprising:
creating a container identifier based on a virtual identifier that identifies task;
tagging the task with the container identifier;
scheduling the task for execution;
accessing a data structure during said execution by mapping the container identifier (ID) to a virtual identifier; and
preventing a task with a first container ID from accessing data of a task with a second container ID.

11. The method as recited in claim 10, wherein the data structure is a page table.

12. The method as recited in claim 11, further comprising accessing a mapping table comprising a plurality of entries, each of the plurality of entries being configured to store a mapping between a container ID and a virtual ID.

13. The method as recited in claim 12, further comprising accessing the mapping table using a container ID in order to retrieve a corresponding virtual ID.

14. The method as recited in claim 10, further comprising generating the container ID by hashing the virtual ID of the task with one of an operating system ID and a virtual function ID.

15. The method as recited in claim 10, wherein the container ID uniquely identifies the task.

16. The method as recited in claim 10, further comprising concurrently executing a first task and a second task, by a graphics processing unit, wherein the first task is associated with a first operating system and the second task is associated with a second operating system different from the first operating system.

17. The method as recited in claim 16, further comprising identifying the first task using a first container ID and identifying the second task using a second container ID.

18. The method as recited in claim 17, further comprising generating the first container ID based at least in part on an ID associated with the first operating system, and generating the second container ID based at least in part on an ID associated with the second operating system.

19. A computing system comprising:
a communication fabric comprising a mapping table; and
a processor coupled to the communication fabric;
wherein the processor is configured to:
create a container identifier (ID) based on a virtual identifier that identifies a task;
tag the task with the container ID;
access a data structure during execution by mapping the container identifier (ID) to a virtual identifier; and
prevent a task with a first container ID from accessing data of a task with a second container ID.

20. The computing system as recited in claim 19, wherein the container ID is based at least in part on a hash of the virtual ID of the task with one of an operating system ID and a virtual function ID.

* * * * *